H. Garbanati,
Carring Fork.
No. 26,579. Patented Dec. 27, 1859.
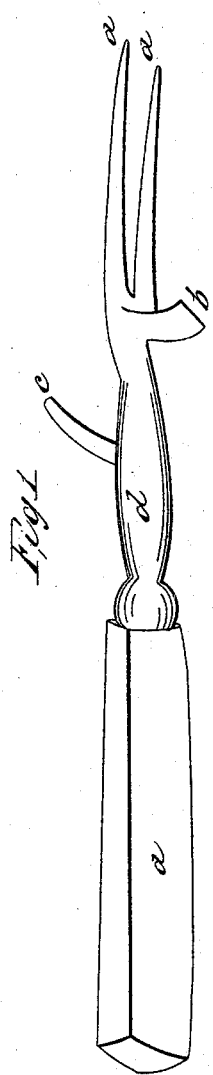
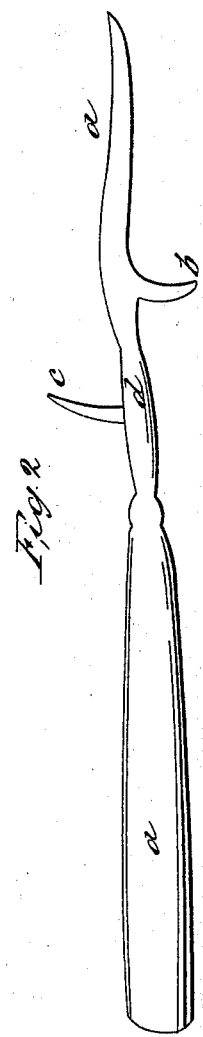
Witnesses
Charles A. Seely
Chas. Hadfield
Inventor
Henry Garbanati

UNITED STATES PATENT OFFICE.

HENRY GARBANATI, OF BROOKLYN, NEW YORK.

CARVING-FORK.

Specification of Letters Patent No. 26,579, dated December 27, 1859.

*To all whom it may concern:*

Be it known that I, HENRY GARBANATI, of Brooklyn, in the county of Kings and State of New York, have invented a new and Improved Carving-Fork; and I do hereby declare that the following is a full and exact description thereof, reference being had to the accompanying drawings and to the letters of reference marked thereon.

The nature of my invention consists in providing the carving fork with two guards, spurs or projections, one on each side of the fork, to be used as guards or fulcrums when the fork is operated as a lever, and so made permanent or a part of the body of the fork that no space is offered for the lodgment of dirt.

To enable others skilled in the art to make and use my invention I will proceed to describe its construction and operation, reference being had to the accompanying drawings which make a part of this specification whereof—

Figure 1 is a perspective view and Fig. 2 a longitudinal section.

$a\ a$ represent the tines of the fork, $d$ the shank, $e$ the handle.

$b$ is a projection at the junction of the tines to be used as a fulcrum or guard.

$c$ is a spur to be used chiefly as a guard and attached near the middle of the shank and on an opposite side from the fulcrum $b$. The fulcrum $b$ and the guard $c$ are firmly and permanently attached to the shank and form a part of it.

In operating the fork, the spur guard $c$ is designed for the usual service of the ordinary hinge guard, and the projection $b$ in addition to its use as a guard serves as a fulcrum of a lever and also to insure a firmer hold of the meat to be carved.

What I claim as my invention and desire to secure by Letters Patent is—

The permanent spur guard $c$, the fulcrum guard $b$ in combination with a carving fork substantially as described.

HENRY GARBANATI.

Witnesses:
CHARLES A. SEELY,
GEO. F. VAN DOORN.